United States Patent [19]
Liao

[11] Patent Number: 5,673,417
[45] Date of Patent: Sep. 30, 1997

[54] ELECTRONIC ORGANIZER WITH A FLASH MEMORY AND ASSOCIATED DATA ARCHIVING

[75] Inventor: Thomas Liao, Taipei, Taiwan

[73] Assignee: Inventec Corporation, Taipei, Taiwan

[21] Appl. No.: 504,659

[22] Filed: Jul. 20, 1995

[51] Int. Cl.⁶ .................................................. G06F 12/16
[52] U.S. Cl. .................... 395/488; 395/492; 395/428
[58] Field of Search .......................... 395/401, 428–431, 395/444, 460, 461, 468–473, 486, 488, 489, 492, 497.01, 497.04

[56] References Cited

U.S. PATENT DOCUMENTS 5,457,476  10/1995  Jensen ........................................ 345/146
5,606,532   2/1997  Lambrache et al. ................. 365/238.5

OTHER PUBLICATIONS

Misubishi Electric Introduces mixed memory card incorporating SRAM and Flash Memory, Dateline, Tokyo, Japan Oct. 6, 1992.
Feigel, Flash memory heads toward mainstream . . . , Microprocessor Report, v8,n7, p19(7) 1994.

Primary Examiner—Matthew M. Kim
Attorney, Agent, or Firm—Jacobson, Price, Holman & Stern, PLLC

[57] ABSTRACT

An electronic organizer including a CPU, a key switch matrix, a LCD drive, a LCD, a power supply, a flash memory, and a SRAM, wherein the flash memory has a program storage zone for storing the system control program, and a personal data storage zone divided into a plurality of sub-data storage zones for storing different personal data; the SRAM has a system parameter storage zone for storing a plurality of system parameters, and a personal data working zone for registering data from the personal data storage zone of the flash memory; when the user selects the desired personal data from the flash memory through the key switch matrix, the CPU is driven to fetch the respective data from the flash memory and register the data in the personal data working zone of the SRAM for permitting the user to search or edit the data by means of the parameters in the system parameter storage zone of the SRAM; the registered data will not be sent from the personal data working zone of the SRAM back to the flash memory when the search is done, and will be sent from the personal data working zone of the SRAM back to the flash memory after when the data is edited.

4 Claims, 4 Drawing Sheets

ELECTRONIC ORGANIZER WITH A FLASH MEMORY AND ASSOCIATED DATA ARCHIVING

BACKGROUND OF THE INVENTION

The present invention relates to electronic organizers, and relates more particularly to such an electronic organizer which uses a flash memory as a data storage medium for storing data.

Regular electronic organizers commonly use a SRAM (static random access memory) as a data storage medium for storing data. Because a SRAM needs battery power supply to keep the data. If battery power fails, the data in the SRAM may be destroyed, causing the user to suffer a big loss. Recently, flash memories have been well developed for reading and writing data, and for keeping data without battery power supply. In comparison with regular SRAMs, flash memories are simple in structure and less expensive. The disadvantage of flash memories is that stored data must be cleared before writing.

SUMMARY OF THE INVENTION

The main object of the present invention is to provide an electronic organizer which uses a flash memory as a data storage medium for storing data to improve the storage performance of the organizer. According to one aspect of the present invention, the electronic organizer including a CPU, a key switch matrix, a LCD drive, a LCD, a power supply, a flash memory, and a SRAM, wherein the flash memory has a program storage zone for storing the system control program, and a personal data storage zone divided into a plurality of sub-data storage zones for storing different personal data; the SRAM has a system parameter storage zone for storing a plurality of system parameters, and a personal data working zone for registering data from the personal data storage zone of the flash memory.

According to another aspect of the present invention, when the user selects the desired personal data from the flash memory through the key switch matrix, the CPU is driven to fetch the respective data from the flash memory and register the data in the personal data working zone of the SRAM for permitting the user to search or edit the data by means of the parameters in the system parameter storage zone of the SRAM; the registered data will not be sent from the personal data working zone of the SRAM back to the flash memory when the search is done, and will be sent from the personal data working zone of the SRAM back to the flash memory only after the data is edited.

DETAILED DESCRIPTION OF THE PREFERRED EMBODIMENT

Figure 1:
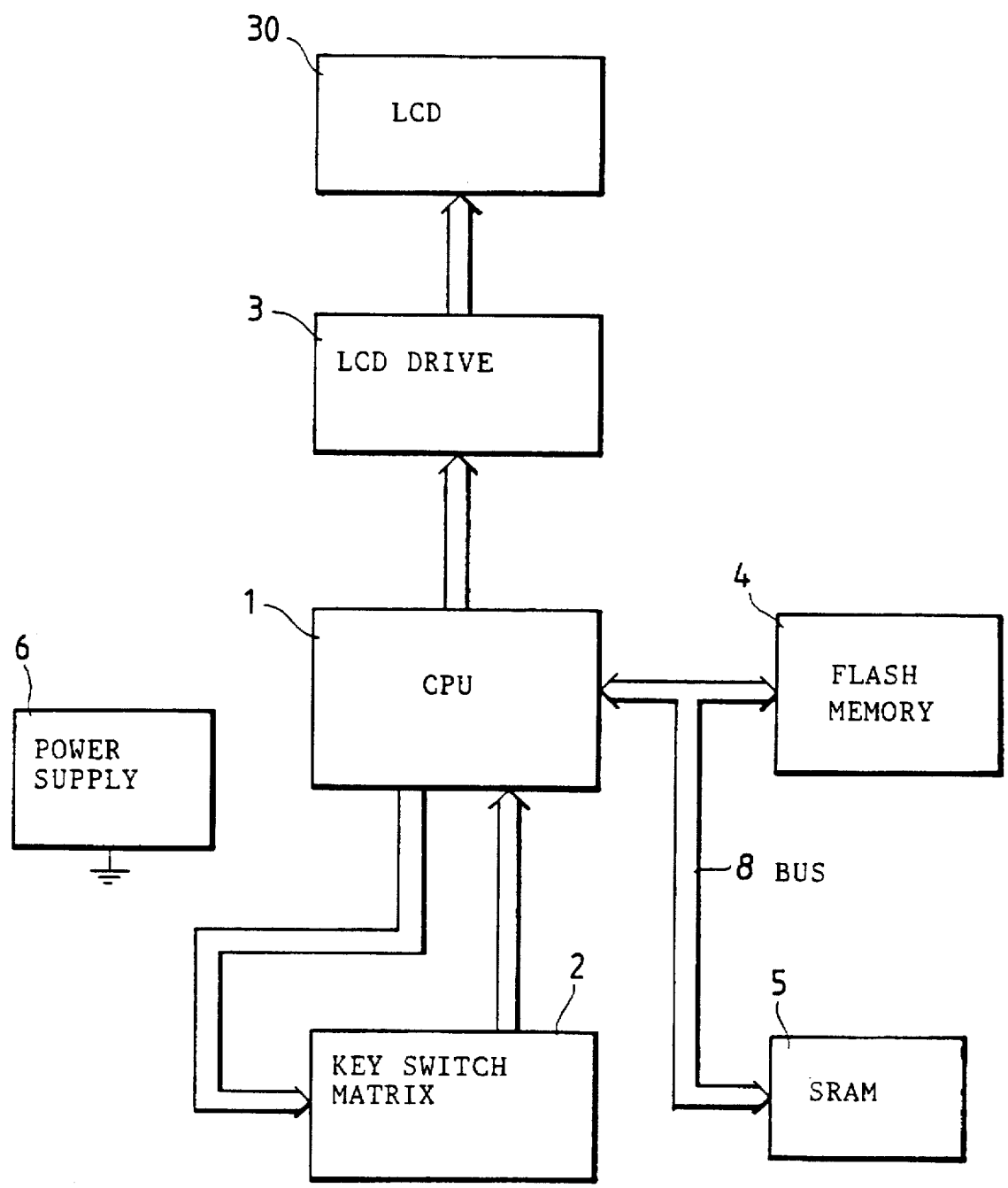
FIG. 1 is a circuit block diagram of an electronic organizer according to the present invention.
Figure 2:
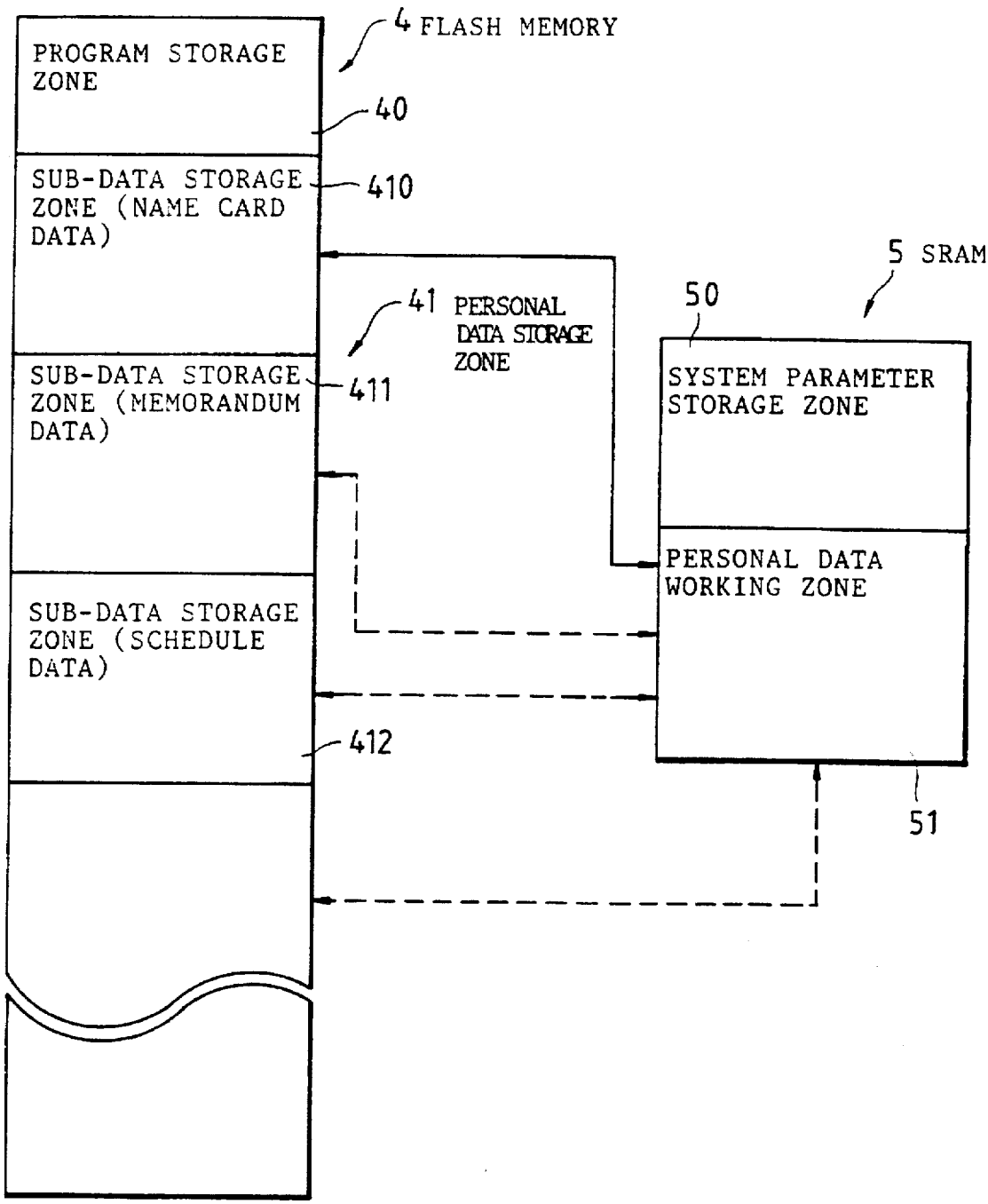
FIG. 2 illustrates the data storage allocation of the flash memory and the static random access memory of FIG. 1.

Referring to FIG. 1, the CPU (central processing unit) 1 is the control center of the electronic organizer to control the operation of a key switch matrix 2, a LCD drive 3, a LCD 30, a flash memory 4, and a SRAM (static random access memory) 5. The flash memory 4 and the SRAM 5 are connected to the CPU 1 through the same bus 8. The key switch matrix 2 is for inputting instructions and data into the CPU. The LCD drive 3 receives instructions and data from the CPU 1, and then sends a display signal to the LCD 30, causing it to display the respective data. The flash memory 4, as shown in FIG. 2, comprises a program storage zone 40 for storing the system control program, and a personal data storage zone 41 for storing personal data. The personal data storage zone 41 is divided into several sub-data storage zones for storing, for example, name card data 410, memorandum data 411, schedule data 412, etc. The SRAM 5, as shown in FIG. 2, comprises a system parameter storage zone 50 for storing a plurality of system parameters, and a personal data working zone 51 for registering data from the personal data storage zone 41. Furthermore, the power supply unit, referenced by 6, provides the necessary working voltage to the system.

Figure 3:
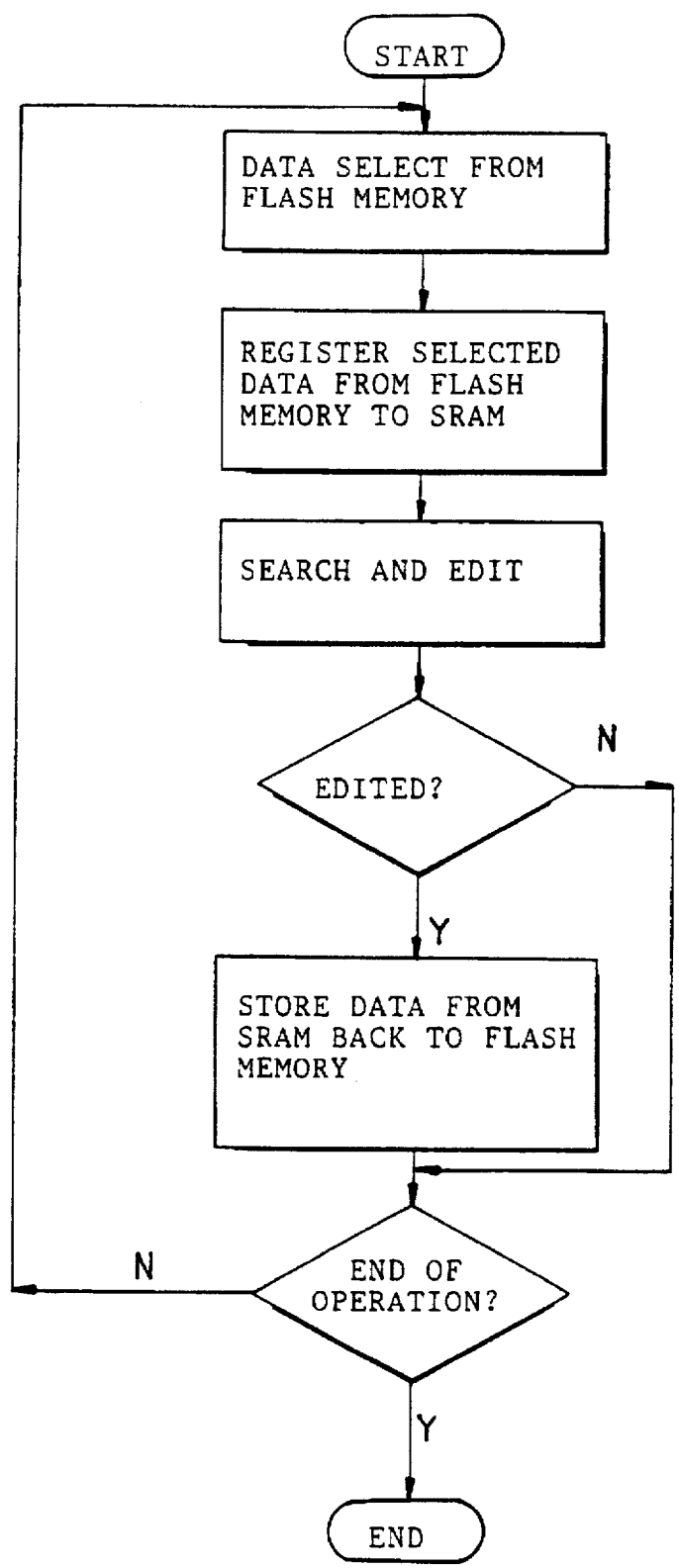
FIG. 3 is a flow chart showing the control flow of the internal control program of the flash memory according to the present invention.

When the system is operated, the CPU 1 starts executing the control program in the program storage zone 40 of the flash memory 4. As illustrated in FIG. 3 when started, the CPU 1 is at the stand-by mode to wait for instructions and data from the key switch matrix 2. When the user uses the key switch matrix 2 to select name card data 410, memorandum data 411, or schedule data 412, etc., from the flash memory 4, the CPU 1 immediately fetches the respective data from the flash memory 4 and then stores the data in the personal data working zone 51 of the SRAM 5, enabling the user to search and edit (amend, add, delete) data by means of the parameters in the system parameter storage zone 50. If only to search data, it is not necessary to send the data from the personal data working zone 51 of the SRAM 5 back to the flash memory 4 after the search is done. The data will be sent from the personal data working zone 51 of the SRAM 5 back to the flash memory 4 if the edit mode is executed. This design reduces the frequency of writing data in the flash memory 4 and, prevents the edited data from missing (because the registered data is stored in the flash memory after it is edited). Through the operation of the LCD drive 3, all stored data can be shown through the LCD 30. An ASIC can be used to take the place of the CPU 1, and to achieve the same function.

Figure 4:
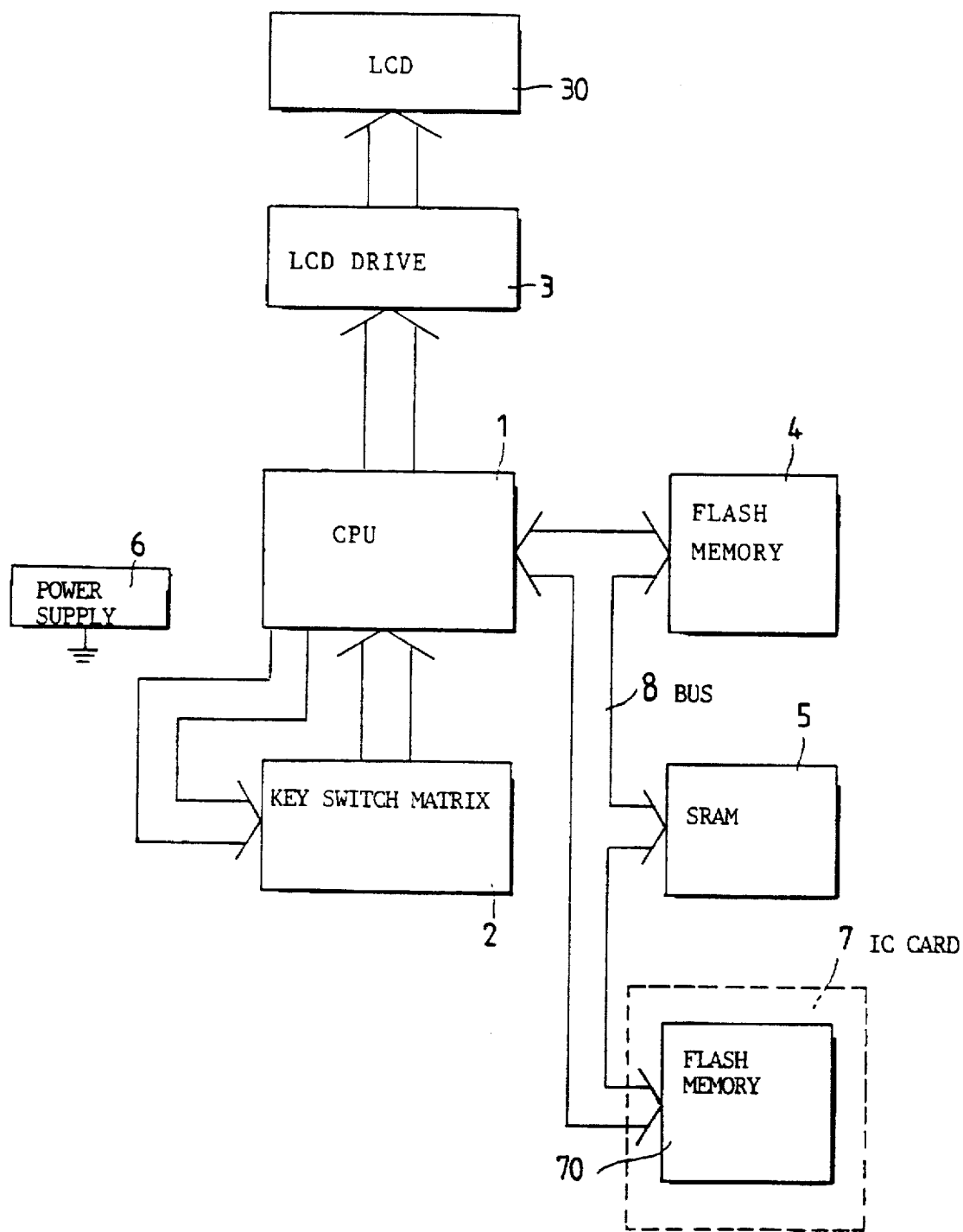
FIG. 4 is a circuit block diagram of an alternate form of the present invention.

FIG. 4 shows an alternate form of the present invention, in which an IC card 7 having a flash memory 70 can be externally connected to the bus 8 to expand the memory storage capacity.

It is to be understood that the drawings are designed for purposes of illustration only, and are not intended as a definition of the limits and scope of the invention disclosed.

I claim:

1. An electronic organizer comprising: a CPU (central processing unit) for controlling the operation of the organizer, a key switch means for inputting instructions and data into said CPU by an user, a display means driven to display data from said CPU, a display means drive controlled by said CPU to drive said display means in displaying data from said CPU, and a power supply for providing the organizer with the necessary working voltage, wherein a flash memory and a SRAM (static random access memory) are installed and connected to said CPU by a bus, said flash memory comprising a program storage zone for storing the system control program, and a personal data storage zone for storing personal data, said personal data storage zone being divided into a plurality of sub-data storage zones for storing different personal data, said SRAM comprising a system parameter storage zone for storing a plurality of system parameters, and a personal data working zone for registering data from said personal data storage zone of said flash memory, wherein when the system control program of said flash memory is executed, said CPU is at the stand-by mode to wait for input instructions and data from said key switch means; when the user selects the desired personal data from said flash memory through said key switch means, said CPU is driven to fetch the respective data from said flash memory and register the data in the personal data working zone of said SRAM for permitting the user to search or edit the data in the personal data working zone of said SRAM by means of the parameters in the system parameter storage zone of said SRAM; the registered data will not be sent from the personal data working zone of said SRAM back to said flash memory when the search is done and will be sent from the personal data working zone of said SRAM back to said flash memory after when the data is edited.

2. The electronic organizer of claim 1 wherein the personal data storage zone of said flash memory comprises a plurality of sub-data storage zones for personal name card data, memorandum data, and schedule data.

3. The electronic organizer of claim 1 further comprising an IC card having a built-in flash memory for connection to said CPU.

4. The electronic organizer of claim 1 wherein said CPU is ASIC.

* * * * *